United States Patent
Ooishi

(10) Patent No.: US 9,716,805 B2
(45) Date of Patent: Jul. 25, 2017

(54) IMAGE FORMING SYSTEM WITH IDENTIFICATION MARK COLOR SETTING

(71) Applicant: Konica Minolta, Inc., Tokyo (JP)

(72) Inventor: Akihiko Ooishi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/045,745

(22) Filed: Feb. 17, 2016

(65) Prior Publication Data
US 2016/0255232 A1    Sep. 1, 2016

(30) Foreign Application Priority Data
Feb. 26, 2015    (JP) ................................. 2015-036061

(51) Int. Cl.
*H04N 1/00* (2006.01)
*G06K 9/20* (2006.01)
(Continued)

(52) U.S. Cl.
CPC ....... *H04N 1/00968* (2013.01); *G06K 9/2063* (2013.01); *H04N 1/46* (2013.01); *H04N 1/6094* (2013.01)

(58) Field of Classification Search
None
See application file for complete search history.

(56) References Cited

U.S. PATENT DOCUMENTS 6,290,318 B1 * 9/2001 Yasukawa ............ H04N 1/6097
347/14
2002/0144578 A1 * 10/2002 Mikkelsen ............... B26D 5/00
83/13
(Continued)

FOREIGN PATENT DOCUMENTS

JP    H09-305695 A    11/1997
JP    2006-165889 A    6/2006
(Continued)

OTHER PUBLICATIONS

Notification of Reasons for Refusal dated Jan. 24, 2017 from corresponding Japanese Patent Application No. JP 2015-036061; English translation of Notification of Reasons for Refusal; Total of 24 pages.

*Primary Examiner* — Barbara Reinier
(74) *Attorney, Agent, or Firm* — Lucas & Mercanti, LLP

(57) ABSTRACT

An image forming system that includes an image forming apparatus which forms a predetermined identification mark on a recording medium and a reading apparatus which reads the identification mark formed on the recording medium, the image forming system including: a color information acquisition unit which acquires color information indicating a color of the recording medium; an identification mark color setting unit which sets a color of the identification mark to be formed on the recording medium by the image forming apparatus to a color distinguishable by the reading apparatus from the color indicated by the color information that is acquired by the color information acquisition unit; and an image forming control unit which controls the image forming apparatus to form the identification mark in the color set by the identification mark color setting unit on the recording medium.

12 Claims, 9 Drawing Sheets

(51) Int. Cl.
*H04N 1/60* (2006.01)
*H04N 1/46* (2006.01)

(56) References Cited

U.S. PATENT DOCUMENTS

| | | | | |
|---|---|---|---|---|
| 2005/0270357 | A1* | 12/2005 | Kawai | B26D 5/34 347/105 |
| 2007/0009277 | A1* | 1/2007 | Shoen | G03G 15/5029 399/82 |
| 2014/0139578 | A1* | 5/2014 | Mizes | B41J 2/2146 347/14 |

FOREIGN PATENT DOCUMENTS

| | | |
|---|---|---|
| JP | 2008-003286 A | 1/2008 |
| JP | 2013-058933 A | 3/2013 |
| JP | 2014232141 A | 12/2014 |
| JP | 2016-053760 A | 4/2016 |

* cited by examiner

IMAGE FORMING SYSTEM WITH IDENTIFICATION MARK COLOR SETTING

BACKGROUND OF THE INVENTION

1. Field of the Invention

The present invention relates to an image forming system, a reading apparatus and an image forming apparatus.

2. Description of Related Art

Conventionally, there have been known image forming systems including electrophotographic image forming apparatuses which provide toners to recording media such as sheets of paper and fix the toners to form images and reading apparatuses which read the images that were formed on the recording media by the image forming apparatuses. In such image forming systems, the image forming apparatuses form predetermined identification marks on recording media and the reading apparatuses read the predetermined identification marks so that the reading results can be used for various purposes. For example, information according to the position of an image formed by an image forming apparatus can be obtained by reading identification marks with a reading apparatus and calculating the positions of the identification marks on the recording medium. By feeding back the information to the image forming apparatus and correcting the image forming position with the image forming apparatus, the image can be formed at an appropriate position on the recording medium.

For example, Japanese Patent Application Laid Open Publication No. 2014-232141 discloses a technique of making the respective image forming positions on the front surface and the back surface of a recording medium match each other by calculating the register mark positions as the identification marks formed on the surface of the recording medium from the reading result by the reading apparatus, and correcting the image forming position on the back surface by the image forming apparatus on the basis of the register mark positions.

However, conventional image forming systems have had a problem that, when the color of recording medium is approximate to the color of identification marks recorded on the recording medium, the identification marks are difficult to distinguish from the recording medium on the basis of the reading result by the reading apparatus, and thus, the accuracy in calculating the positions of identification marks based on the reading result is lowered and the identification marks cannot be detected.

SUMMARY OF THE INVENTION

An object of the present invention is to provide an image forming system, a reading apparatus and an image forming apparatus which can appropriately read identification marks regardless of the color of recording medium.

In order to achieve the above object, according to one aspect of the present invention, there is provided an image forming system that includes an image forming apparatus which forms a predetermined identification mark on a recording medium and a reading apparatus which reads the identification mark formed on the recording medium, the image forming system including: a color information acquisition unit which acquires color information indicating a color of the recording medium; an identification mark color setting unit which sets a color of the identification mark to be formed on the recording medium by the image forming apparatus to a color distinguishable by the reading apparatus from the color indicated by the color information that is acquired by the color information acquisition unit; and an image forming control unit which controls the image forming apparatus to form the identification mark in the color set by the identification mark color setting unit on the recording medium.

Preferably, the identification mark color setting unit sets the color of the identification mark to a color having a color difference of a predetermined value or more from the color indicated by the color information.

Preferably, the image forming apparatus forms an image on the recording medium by combining a plurality of color components, and the identification mark color setting unit sets the color of the identification mark to a color among colors according to the plurality of color components, the color having a largest color difference from the color indicated by the color information.

Preferably, the image forming apparatus includes a plurality of monochromatic image forming units which respectively forms monochromatic images according to respective colors of a plurality of color components, and the image forming apparatus forms an image on the recording medium by combining the monochromatic images of the plurality of color components; and the image forming apparatus includes an image forming position setting unit which, in a case where the color of the identification mark set by the identification mark color setting unit includes two color components or more among the plurality of color components, sets forming positions of the monochromatic images by the monochromatic image forming units so that forming positions of the identification mark by the respective monochromatic image forming units match each other, the monochromatic image forming units corresponding to the respective color components included in the color of the identification mark.

Preferably, the reading apparatus reads the color of the recording medium, and the color information acquisition unit acquires the color information from a reading result of the color of the recording medium by the reading apparatus.

Preferably, the reading apparatus reads a color of one recording medium among a plurality of recording media in a same color, and the image forming control unit controls the image forming apparatus to form the identification mark on another recording medium among the plurality of recording media.

Preferably, the image forming system further includes: a recording medium placement unit which has a plurality of recording medium placement surfaces in respective colors among a plurality of predetermined colors; a placement surface color setting unit which sets a color of a recording medium placement surface to a color distinguishable by the reading apparatus from the color indicated by the color information among the plurality of colors; and a recording medium placement control unit which places the recording medium on the recording medium placement surface in the color set by the placement surface color setting unit, and the reading apparatus reads an edge of the recording medium placed on the recording medium placement surface.

Preferably, the placement surface color setting unit sets the color of the recording medium placement surface to a color among the plurality of colors, the color having a color difference of a predetermined value or more from the color indicated by the color information.

Preferably, the image forming system further includes: a recording medium placement unit which has a plurality of recording medium placement surfaces in respective colors among colors according to the plurality of color components; a placement surface color setting unit which sets a color of a recording medium placement surface to a same color as the color of the identification mark set by the identification mark color setting unit; and a recording medium placement control unit which places the recording medium on the recording medium placement surface in the color set by the placement surface color setting unit, and the reading apparatus reads an edge of the recording medium placed on the recording medium placement surface.

Preferably, the color information acquisition unit acquires a plurality of pieces of color information indicating respective colors at a plurality of positions in one recording medium, the identification mark color setting unit sets colors of identification marks on the basis of the colors indicated by the plurality of pieces of the color information acquired by the color information acquisition unit, and the image forming control unit controls the image forming apparatus to form the identification marks in the respective colors set by the identification mark color setting unit at respective positions corresponding to the plurality of positions in the recording medium.

According to another aspect of the present invention, there is provided a reading apparatus which is connected to an image forming apparatus that forms a predetermined identification mark on a recording medium, the reading apparatus including: a reading unit which reads the identification mark that is formed on the recording medium by the image forming apparatus; a color information acquisition unit which acquires color information indicating a color of the recording medium; an identification mark color setting unit which sets a color of the identification mark to be formed on the recording medium by the image forming apparatus to a color distinguishable by the reading unit from the color indicated by the color information that is acquired by the color information acquisition unit; and an output unit which outputs, to the image forming apparatus, a set value indicating the color of the identification mark that is set by the identification mark color setting unit.

According to another aspect of the present invention, there is provided an image forming apparatus, including: an image forming unit which forms a predetermined identification mark on a recording medium; a reading unit which reads the identification mark that is formed on the recording medium by the image forming unit; a color information acquisition unit which acquires color information indicating a color of the recording medium; an identification mark color setting unit which sets a color of the identification mark to be formed on the recording medium by the image forming unit to a color distinguishable by the reading unit from the color indicated by the color information that is acquired by the color information acquisition unit; and an image forming control unit which controls the image forming unit to form the identification mark in the color set by the identification mark color setting unit on the recording medium.

BRIEF DESCRIPTION OF THE DRAWINGS

The above and other objects, advantages and features of the present invention will become more fully understood from the detailed description given hereinbelow and the appended drawings which are given byway of illustration only, and thus are not intended as a definition of the limits of the present invention, and wherein.

DETAILED DESCRIPTION OF THE PREFERRED EMBODIMENT

Hereinafter, an embodiment of an image forming system, a reading apparatus and an image forming apparatus according to the present invention will be described with reference to the drawings.

Figure 1:
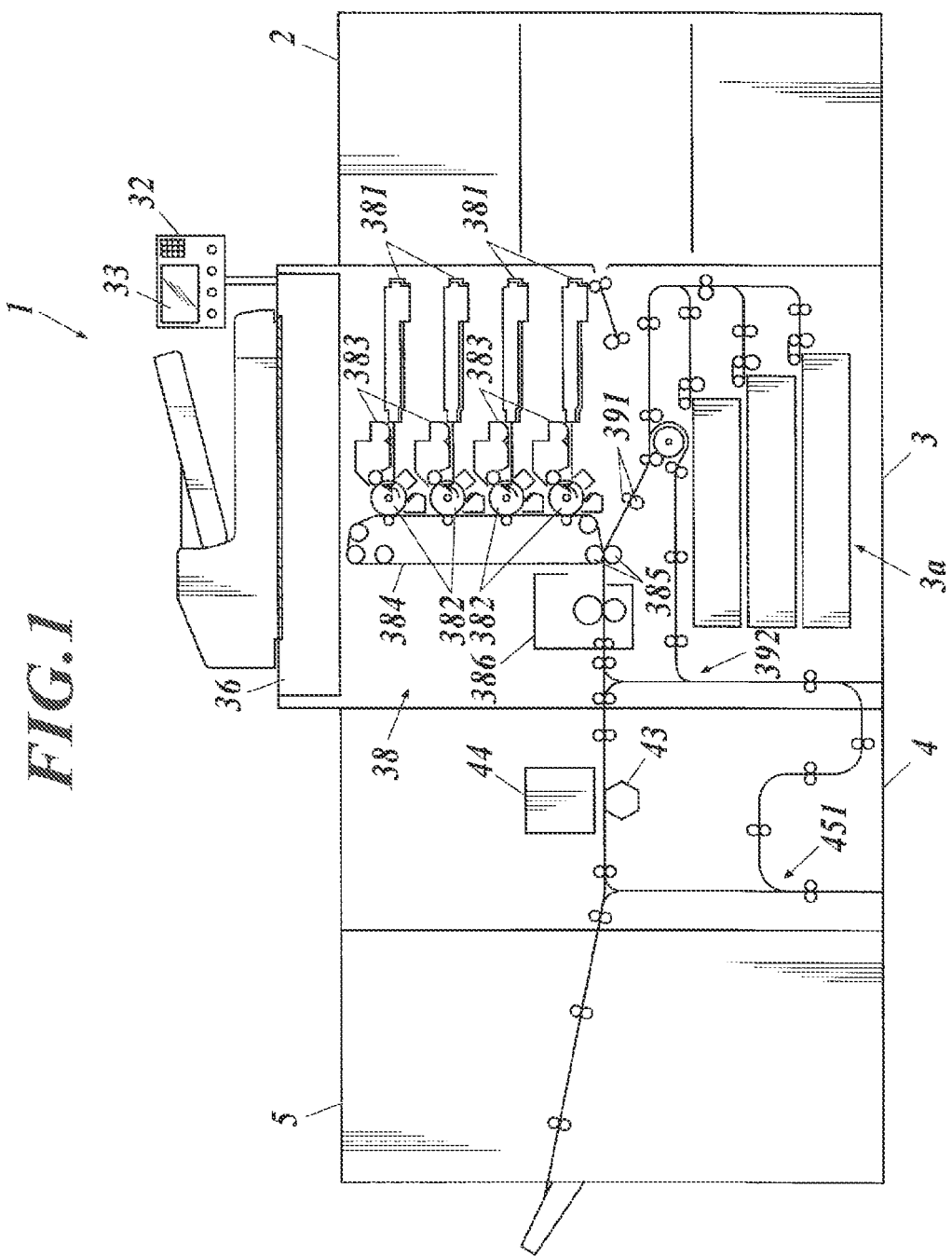
FIG. 1 is a view showing a schematic configuration of an image forming system.

FIG. 1 is a view showing a schematic configuration of an image forming system 1 in an embodiment of the present invention.

The image forming system 1 includes a paper feeding apparatus 2, an image forming apparatus 3, a reading apparatus 4 and a post-processing apparatus 5.

The paper feeding apparatus 2 includes a plurality of sheet accumulation units of large capacity for accumulating many sheets (flat paper) as recording media, and conveys a sheet to the image forming apparatus 3 from a sheet accumulation unit instructed by the image forming apparatus 3.

The image forming apparatus 3 forms an image on the sheet by an electrophotographic method. The image forming apparatus 3 conveys the sheet having the image formed thereon to the reading apparatus 4.

The reading apparatus 4 reads the image formed on the sheet which was conveyed from the image forming apparatus 3. The reading apparatus 4 conveys the sheet, for which the image reading was performed, to the post-processing apparatus 5. The reading apparatus 4 is configured to be attachable to and detachable from the image forming apparatus 3.

The post-processing apparatus 5 performs predetermined post-processing to the sheet conveyed from the reading apparatus 4 and ejects the sheet. The post-processing includes stapling, punching, folding and bookbinding, for example.

Figure 2:
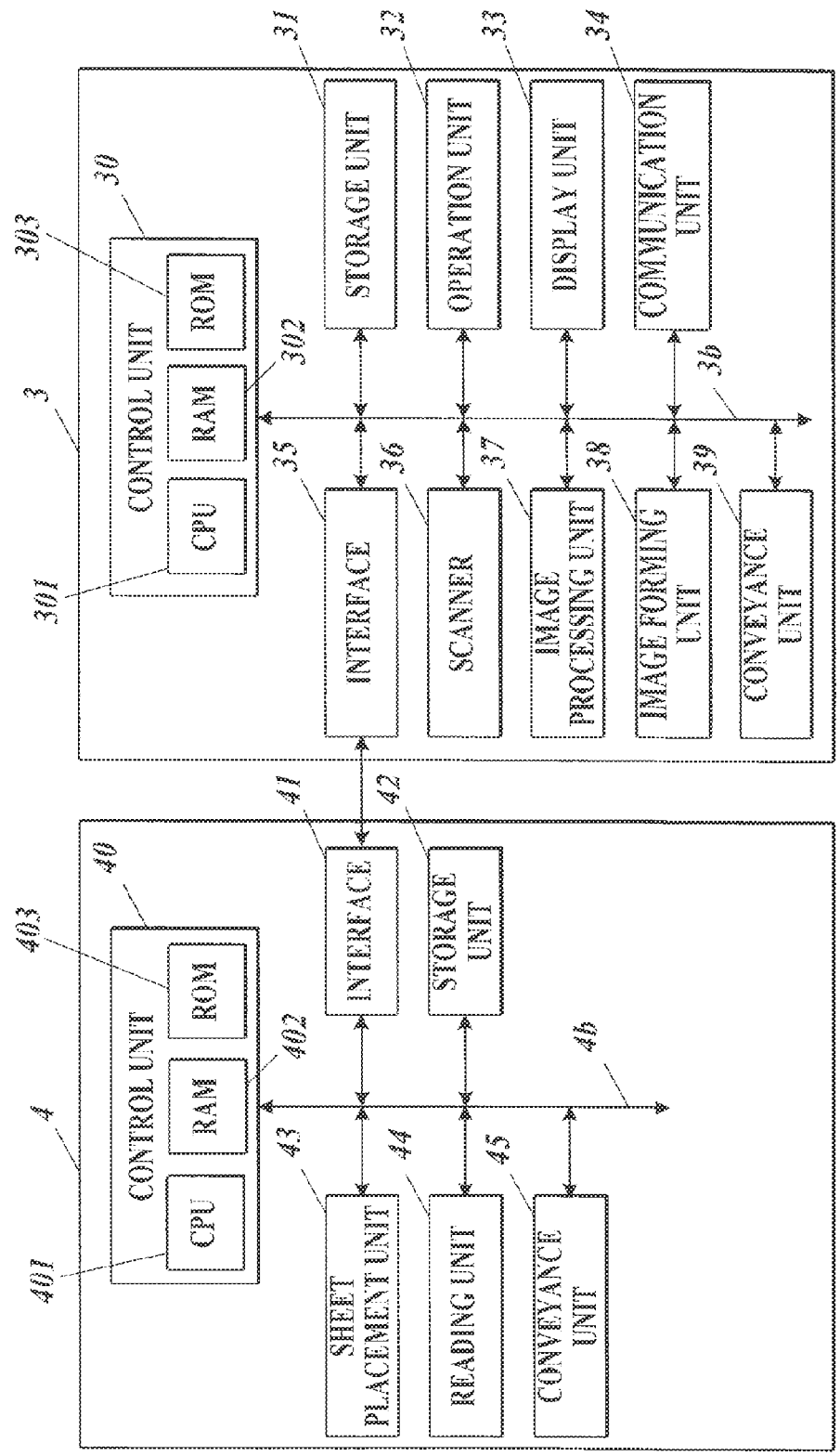
FIG. 2 is a block diagram showing a main functional structure of an image forming apparatus and a reading apparatus.

FIG. 2 is a block diagram showing a main functional configuration of the image forming apparatus 3 and the reading apparatus 4.

The image forming apparatus 3 includes: a control unit 30 (image forming control unit and image forming position setting unit) having a CPU 301 (Central Processing Unit), a RAM 302 (Random Access Memory) and a ROM 303 (Read Only Memory); a storage unit 31; an operation unit 32; a display unit 33; a communication unit 34; an interface 35; a scanner 36; an image processing unit 37; an image forming unit 38; and a conveyance unit 39. The control unit 30 is connected to the storage unit 31, the operation unit 32, the display unit 33, the communication unit 34, the interface 35, the scanner 36, the image processing unit 37, the image forming unit 38 and the conveyance unit 39 via a bus 3b.

The CPU 301 reads out and executes a control program stored in the ROM 303 or the storage unit 31, and performs various types of arithmetic processing.

The RAM 302 provides working memory space to the CPU 301, and stores temporal data. The temporal data includes a set value according to a color of a register mark (identification mark) to be described later which was input from the reading apparatus 4. The set value may be stored in the storage unit 31.

The ROM 303 stores various control programs to be executed by the CPU 301, set data and such like. The ROM 303 may be replaced with a non-volatile memory such as an EEPROM (Electrically Erasable Programmable Read Only Memory) and a flash memory, which is rewritable.

The control unit 30 including the CPU 301, the RAM 302 and the ROM 303 integrally controls the units of the image forming apparatus 3 in accordance with the above-mentioned various control programs. For example, the control unit 30 controls the image processing unit 37 to perform predetermined image processing to image data and stores the processed data in the storage unit 31. The control unit 30 controls the conveyance unit 39 to convey a sheet and controls the image forming unit 38 to form an image on the sheet on the basis of the image data stored in the storage unit 31.

The storage unit 31 is formed of a DRAM (Dynamic Random Access Memory) and such like, and stores image data obtained by a scanner 36, image data input from outside via the communication unit 34, and such like. The image data and such like may be stored in the RAM 302.

The operation unit 32 includes an input device such as operation keys and a touch panel disposed so as to be superposed on a screen of display unit 33. The operation unit 32 converts the input operation performed to the input device into an operation signal and outputs the signal to the control unit 30.

The display unit 33 include a display device such as an LCD (Liquid Crystal Display), and displays the state of image forming system 1, an operation screen showing the contents of input operation to the touch panel, and such like.

In accordance with the control signal from the control unit 30, the communication unit 34 performs communication with a computer on a network and other image forming apparatuses, and transmits/receives image data and such like.

The interface 35 transmits and receives data to and from the reading apparatus 4, and is configured of anyone of various serial interfaces, for example.

The scanner 36 reads the image formed on the sheet, generates image data including monochromatic image data for each color component of R (red), G (green) and B (blue), and stores the image data in the storage unit 31.

The image processing unit 37 includes a rasterizing unit, a color conversion unit, a tone correction unit and a halftone processing unit, performs various types of image processing to the image data stored in the storage unit 31 and stores the processed data in the storage unit 31.

The rasterizing unit converts vector image data, which is described in a predetermined page description language (PDL) input from a computer or the like on a network, into raster image data such as bitmap. The image data which was converted and generated by the rasterizing unit includes monochromatic image data for each color component of C (cyan), M (magenta), Y (yellow) and K (black).

The color conversion unit performs color conversion of image data for each color of R, G and B output from the scanner 36 by referring to a predetermined lookup table, and generates image data including the monochromatic image data of each color of C, M Y and K. The color conversion unit also performs predetermined color correction processing to the image data.

The tone correction unit corrects tone values of image data by referring to a lookup table determining correction values corresponding to respective tone values so that the gradation property of the image according to the image data is a predetermined property.

The halftone processing unit performs halftone processing such as screen processing using dithering matrix and error diffusion with respect to the image data.

A part or all of the rasterizing unit, color conversion unit, tone correction unit and halftone processing unit included in the image processing unit 37 may be achieved by the control unit 30, or may be achieved by another image processing apparatus provided outside the image forming apparatus 3.

The image forming unit 38 forms an image on the sheet on the basis of the image data stored in the storage unit 31. The image forming unit 38 includes four sets of exposure unit 381, photoreceptor 382 and developing unit 383 corresponding to respective color components of C, M, Y and K. The image forming unit 38 also includes a transfer body 384, secondary transfer rollers 385 and a fixing unit 386. A monochromatic image forming unit is formed of the exposure unit 381, the photoreceptor 382 and the developing unit 383 corresponding to one color among the components of the image forming unit 38.

The exposure unit 381 includes an LD (Laser Diode) as a light emitting element. The exposure unit 381 drives the LD on the basis of the image data, emits laser beams onto the charged photoreceptor 382 and performs exposure to form an electrostatic latent image on the photoreceptor 382. The developing unit 383 supplies the toner (color material) of a predetermined color (any one of C, M, Y and K) onto the exposed photoreceptor 382 with the charged developing roller and develops the electrostatic latent image formed on the photoreceptor 382.

The images (monochromatic images) that were formed on the four photoreceptors 382 respectively corresponding to C, M, Y and K with the respective toners of C, M, Y and K are sequentially superposed on the transfer body 384 to be transferred from the respective photoreceptors 382. Thereby, a color image having color components of C, M, Y and K is formed on the transfer body 384. The transfer body 384 is an endless belt wound by a plurality of conveyance rollers, and is rotated in accordance with rotations of respective conveyance rollers.

The secondary transfer rollers 385 transfer the color image on the transfer body 384 onto the sheet which was fed from the paper feeding apparatus 2 or the paper feeding tray 3a.

The fixing unit 386 performs fixing processing for fixing the toners onto the sheet by heating and pressing the sheet on which the image is transferred.

The conveyance unit 39 includes a plurality of conveyance rollers which conveys the sheet by rotating while sandwiching the sheet, and conveys the sheet along a predetermined conveyance path. The conveyance unit 39 includes resist rollers 391 disposed upstream in the conveyance direction of the secondary transfer rollers 385. The resist rollers 391 once stop the conveyance of fed sheet and adjusts the timing of sending the sheet to the secondary transfer rollers 385. The conveyance unit 39 also includes a reversing mechanism 392 which reverses the front and back surfaces of sheet fixed by the fixing unit 386 and conveys the sheet to the secondary transfer rollers 385. In the image forming apparatus 3, in a case where the image is to be formed on the both surfaces of the sheet, the front and back surfaces of the sheet is reversed by the reversing mechanism 392. In a case where the image is to be formed on only one surface of the sheet, the sheet is conveyed to the reading apparatus 4 without reversing the front and back surfaces of the sheet with the reversing mechanism 392.

The reading apparatus 4 includes: a control unit 40 (color information acquisition unit, identification mark color setting unit, placement surface color setting unit, a recording medium placement control unit and output unit) having a CPU 401, a RAM 402 and a ROM 403; an interface 41; a storage unit 42; a sheet placement unit 43; a reading unit 44 and a conveyance unit 45. The control unit 40 is connected to the interface 41, the storage unit 42, and the sheet placement unit 43, the reading unit 44 and the conveyance unit 45 via a bus 4*b*.

The CPU 401 reads out and executes control programs stored in the ROM 403 or the storage unit 42, and performs various types of arithmetic processing.

The RAM 402 provides working memory space to the CPU 401 and stores temporal data.

The ROM 403 stores various control programs to be executed by the CPU 401, set data and such like. A rewritable nonvolatile memory such as an EEPROM and a flash memory may be used instead of the ROM 403.

The control unit 40 including the CPU 401, the RAM 402 and the ROM 403 integrally controls the units of reading apparatus 4 in accordance with the above-mentioned various control programs. For example, the control unit 40 controls the reading unit 44 to read the image formed on the sheet. In accordance with a predetermined algorithm, the control unit 40 sets the color of register mark to be formed by the image forming apparatus 3 and sets the color of sheet placement surface to place the sheet in the sheet placement unit 43.

The interface 41 transmits and receives data to and from the image forming apparatus 3, and is formed of any one of various serial interfaces, for example.

The storage unit 42 is formed of DRAM (Dynamic Random Access Memory) and such like, and stores image data (imaging data) acquired by the reading unit 44. The image data may be stored in the RAM 402.

The sheet placement unit 43 (recording medium placement unit) is a unit to place the sheet when the reading unit 44 reads the sheet.

Figure 3A:
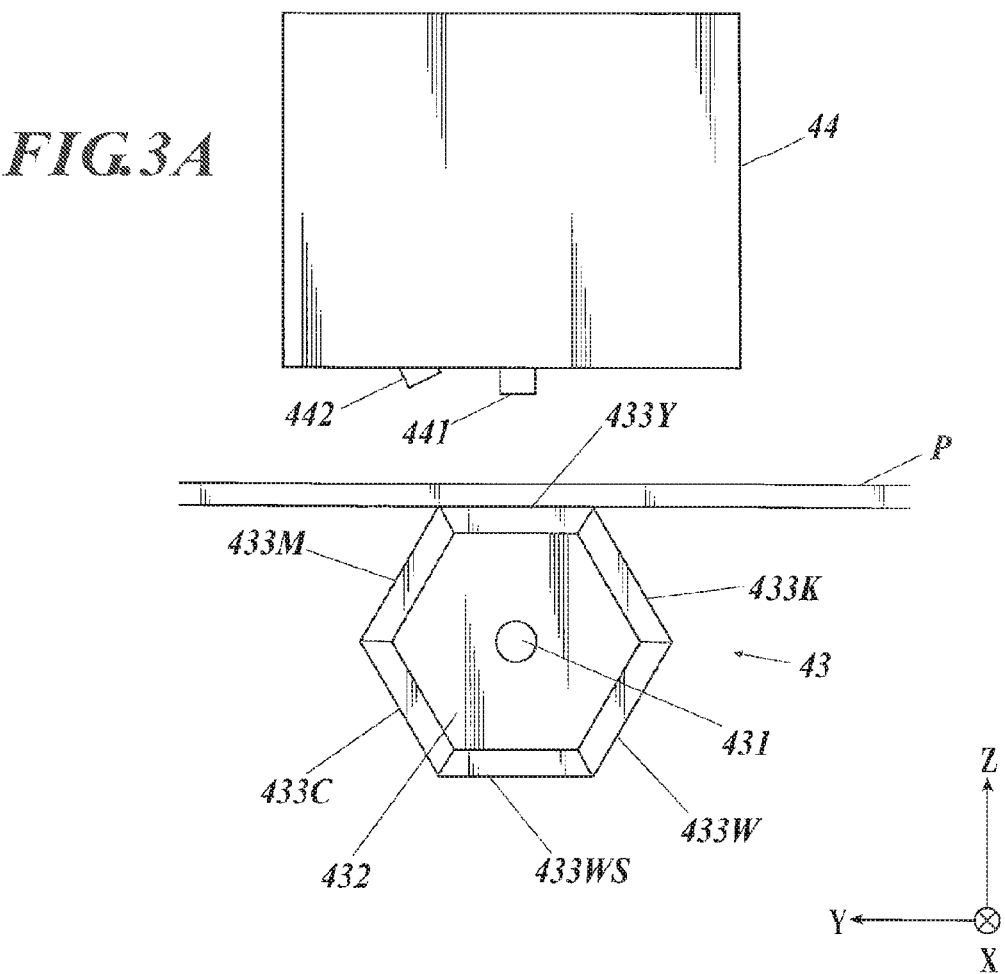
FIGS. 3A and 3B are schematic views showing a configuration of a sheet placement unit.
Figure 3B:
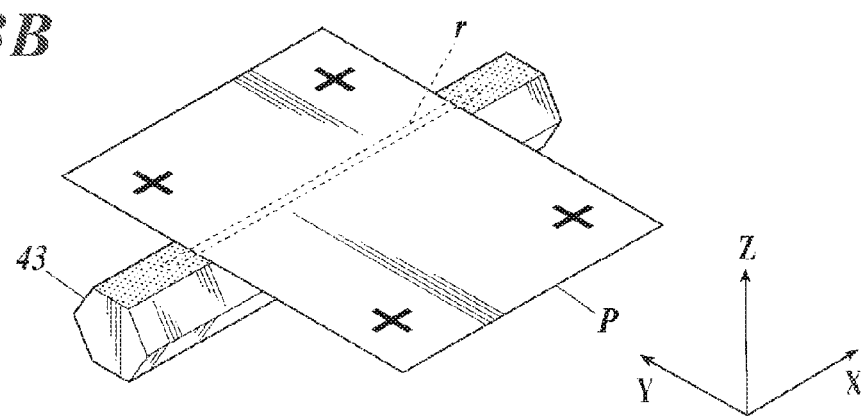

FIGS. 3A and 3B are schematic views each showing the configuration of sheet placement unit 43. FIG. 3A is a schematic view when the sheet placement unit 43 and the reading unit 44 are seen from a direction parallel to the rotation shaft 431 of the sheet placement unit 43, and FIG. 3B is a perspective schematic view of the sheet placement unit 43.

The sheet placement unit 43 includes a rotation shaft 431 which extends in the width direction (X direction) orthogonal to the conveyance direction (Y direction) of the sheet P, a main body 432 in hexagonal column shape rotating around the rotation shaft 431 and sheet placement surfaces 433C, 433M, 433Y, 433K, 433W and 433WS (recording medium placement surfaces) (hereinafter, simply referred to as sheet placement surfaces) (433) respectively formed on the six lateral surfaces of the main body 432. The sheet placement unit 43 is controlled by the control unit 40 so that a predetermined one of the six sheet placement surfaces 433 faces the reading unit 44, and the sheet P is placed on the sheet placement surface 433 facing the reading unit 44.

The sheet placement surfaces 433C, 433M, 433Y, 433K and 433W are surfaces in colors of C, M, Y, K and W (white), respectively. The sheet placement surface 433WS is a surface in white color and used as a standard white board when the reading apparatus 4 performs shading correction. In such way, the sheet placement unit 43 includes the sheet placement surfaces 433C, 433M, 433Y and 433K of the colors same as the colors according to the color components (C, M, Y and K) used for image formation in the image forming unit 38 of the image forming apparatus 3.

The reading unit 44 photographs a sheet placement surface 433 of the sheet placement unit 43, the image formed on the sheet on the sheet placement surface 433 and the surface of the sheet, and outputs two-dimensional imaging data. The reading unit 44 includes a line sensor 441 extending in the X direction of FIG. 3A and a light source 442 which extends in the X direction and emits light to the sheet.

The line sensor 441 includes three arrays of a plurality of imaging elements which are one-dimensionally arranged in the X direction. The three arrays of imaging elements receive, through color filters transmitting light of respective colors of R, G and B, the reflected light of the light emitted from the light source 442 and reflected at the sheet surface. Then, the three arrays of imaging elements output the signals corresponding to the intensities of wavelength components of R, G and B in the reflected light. As the imaging elements of the line sensor 441, CMOS (Complementary Metal Oxide Semiconductor) sensor including photodiode as photoelectric conversion element or CCD (Charge Coupled Device) sensor can be used, for example. The line sensor 441 is disposed so that the light receiving section of the imaging element is exposed to the surface facing the sheet placement surface 433 of the reading unit 44.

The reading unit 44 reads the portion of sheet placement surface 433 and the sheet P on the sheet placement surface 433, the portion being included in a predetermined rectangular reading range r extending in the X direction shown in FIG. 3B. By alternately repeating the reading and the conveyance of sheet P in the Y direction, the reading unit 44 reads the range including the entire surface of the sheet P. The reading unit 44 converts analog signals output from the arrays of imaging elements of line sensor 441 into the digital signals, generates imaging data including image data of R, G and B and outputs the data to the control unit 40.

The conveyance unit 45 includes a plurality of conveyance rollers which convey the sheet by rotating while sandwiching the sheet, and conveys the sheet along the predetermined conveyance path. The conveyance unit 45 also includes a reversing mechanism 451 which reverses the front and back surfaces of sheet read by the reading unit 44 and conveys the sheet to the secondary transfer rollers 385 of the image forming apparatus 3.

Next, correction of image forming position by the image forming apparatus 3 to be performed in the image forming system 1 will be described.

As described above, in the image forming system 1, an image can be formed on both of the front and back surfaces of the sheet. However, when the image forming apparatus 3 cannot accurately form an image at the center of the sheet, the positions of image formed on respective front and back surfaces of sheet are shifted from each other.

Thus, in the image forming system 1 of the embodiment, predetermined position gap correction processing is performed before performing normal image recording processing to the sheet. In the position gap correction processing, the image forming apparatus 3 records register marks showing the image forming position on the sheet, the forming position of register marks on the sheet is calculated from the reading result of register marks by the reading apparatus 4, and the image forming position by the image forming apparatus 3 is corrected on the basis of the calculated register mark positions. BY performing the position gap correction processing, the image forming positions on the front surface and the back surface of the sheet can match each other.

Figure 4:
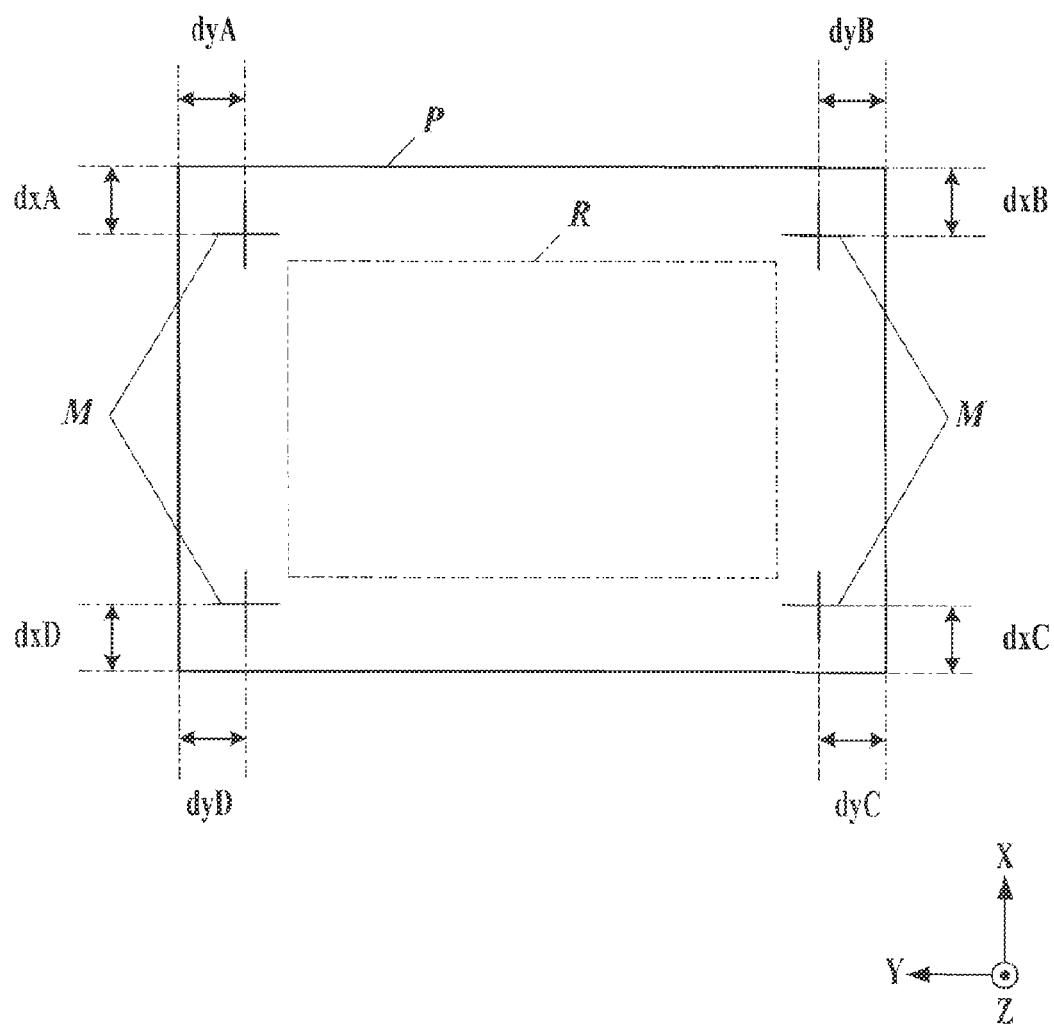
FIG. 4 is a view showing register marks formed on a sheet in position gap correction processing.

FIG. 4 is a view showing register marks M formed on the sheet in the position gap correction processing.

The register marks M are cross-shaped identification marks respectively formed near the four corners of the sheet P. The positions of register mark M are shown by intersections of the crosses. The position of upper left register mark in FIG. 4 is represented by the distances dxA and dyA which are distances from the sheet upper side and left side, the position of upper right register mark M is represented by the distances dxB and dyB from the upper side and right side of sheet, the position of lower right register mark M is represented by the distances dxC and dyC respectively from the lower side and right side of sheet, and the position of lower left register mark M is represented by the distances dxD and dyD respectively from the lower side and left side of the sheet.

The register marks M are formed so as to be located outside the rectangular image forming region R in which an image is to be formed on the sheet P by the image forming apparatus 3. At this time, the register marks M are formed at such positions that a rectangle with the corners located at the positions of the four register marks M has sides parallel to the respective sides of the image forming region R and has the center matching the center of the image forming region R. For example, the four register marks M may be formed at the positions located on the respective lines connecting the center of image forming region R with the corners and having the same distance from the center. The register marks M may also be formed so that the positions thereof match the respective corners of the image forming region R.

The register marks M formed in such way show the position of image forming region R in the sheet P. That is, the position of image forming region R in the sheet P can be obtained by calculating the above-mentioned distances dxA, dyA, dxB, dyB, dxC, dyC, dxD and dyD.

In the image forming system 1, since an image is formed on a white or monochromatic sheet P in many cases, the register marks M are generally formed in black (that is, by using the toner of K only) so that the reading apparatus 4 can easily read the register marks M formed on the sheet P. In addition, reading by the reading unit 44 is performed in a state in which the sheet P is placed on the black sheet placement surface 433K of the sheet placement unit 43 so that the reading apparatus 4 can easily read the edges of sheet P.

However, in a case where the sheet P is in a deep color such as charcoal and black, it is difficult to distinguish the black register marks M from the sheet P on the basis of the reading result by the reading apparatus 4 and difficult to distinguish the black sheet placement surface 433K from the sheet P. Thus, the identification accuracy of positions of register marks M and sheet edges based on the reading result by the reading apparatus 4 is lowered and the register marks M and sheet edges cannot be detected on the basis of the reading result in some cases.

Thus, in the image forming system 1 of the embodiment, the colors of register marks M and sheet placement surface 433K are set to be a color distinguishable from the color of sheet P by the reading apparatus 4. Then, the image forming apparatus 3 forms register marks M in the set color on the sheet P and the reading unit 44 performs reading in a state in which the sheet P is placed on the sheet placement surface 433 in the set color. Hereinafter, a method of determining the color of register marks M and the color of sheet placement surface 433 will be described.

In the image forming system 1, a sheet of the same color as the color of sheet P to perform image formation is first conveyed to the reading apparatus 4 as a dummy sheet and the reading apparatus 4 reads the dummy sheet to generate imaging data. The color information indicating the color of dummy sheet is acquired from the imaging data.

The color difference is then calculated, the color difference between the color indicated by the acquired color information and each color according to the color component (C, M, Y and K) used for image formation in the image forming unit 38 of the image forming apparatus 3. Here, each of the color indicated by the color information and colors C, M, Y and K is converted into L*a*b* color system, and the color difference therebetween ($\Delta E^*ab$) is calculated by Expression ($\Delta E^*ab$)=$\{(\Delta L^*)^2+(\Delta a^*)^2+(\Delta b^*)^2\}^{1/2}$. Here, $\Delta L^*$, $\Delta a^*$, $\Delta b^*$ are differences in values at $L^*$, $a^*$ and $b^*$ coordinates between two colors to be compared for the color difference. As for each color of C, M, Y and K, the value converted into the L*a*b* color system may be stored in the ROM 403 and such like in advance so as to be read out from the ROM 403 as needed.

The color difference may be calculated in uniform color space other than the L*a*b* color system.

Among the colors of C, M, Y and K, the color having the color difference of a predetermined value or more from the sheet P color and having the largest color difference from the dummy sheet color indicated by the above-mentioned color information is set as the color of register marks M and the color of sheet placement surface 433. Here, the predetermined value of color difference can be the minimum value among specific values, each specific value satisfying the condition that the reading unit 44 can distinguish between arbitrary two colors having the color difference of the specific value, for example. The predetermined value of the color difference is set so that at least one of the color differences between an arbitrary color and the respective colors of C, M, Y and K is larger than the predetermined value. For example, when the dummy sheet is in black (or charcoal closer to black), the color of register marks M and the sheet placement surface 433 is set to be Y (yellow) from among the colors of C, M, Y and K, the yellow having the largest color difference from black.

Next, the position gap correction processing executed in the image forming system 1 will be described. The position gap correction processing is processing for making the respective positions of image forming region R on the front surface and the back surface of sheet P by the image forming apparatus 3 match each other. The position gap correction processing is executed when an input operation of instructing the shift to the position gap correction mode was performed to the operation unit 32. Here, the position gap correction mode is an operation mode in which the position gap correction processing is performed by the image forming system 1.

Figure 5:
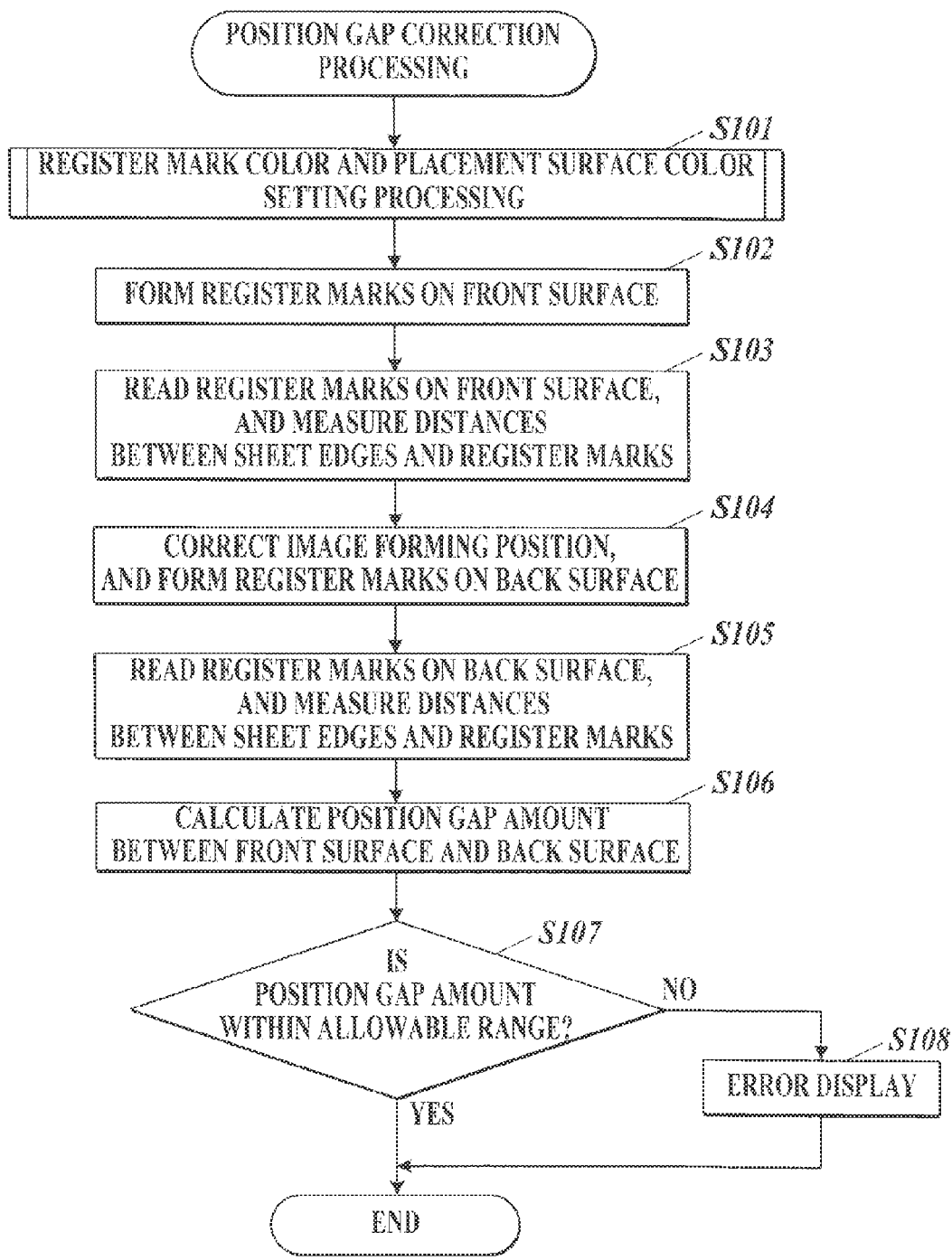
FIG. 5 is a flowchart showing a control procedure of position gap correction processing.

FIG. 5 is a flowchart showing the control procedure of position gap correction processing.

When the input operation of instructing the shift to the position gap correction mode is performed to the operation unit 32, the control unit 30 of the image forming apparatus 3 and the control unit 40 of the reading apparatus 4 executes predetermined register mark color and placement surface color setting processing (step S101).

Figure 6:
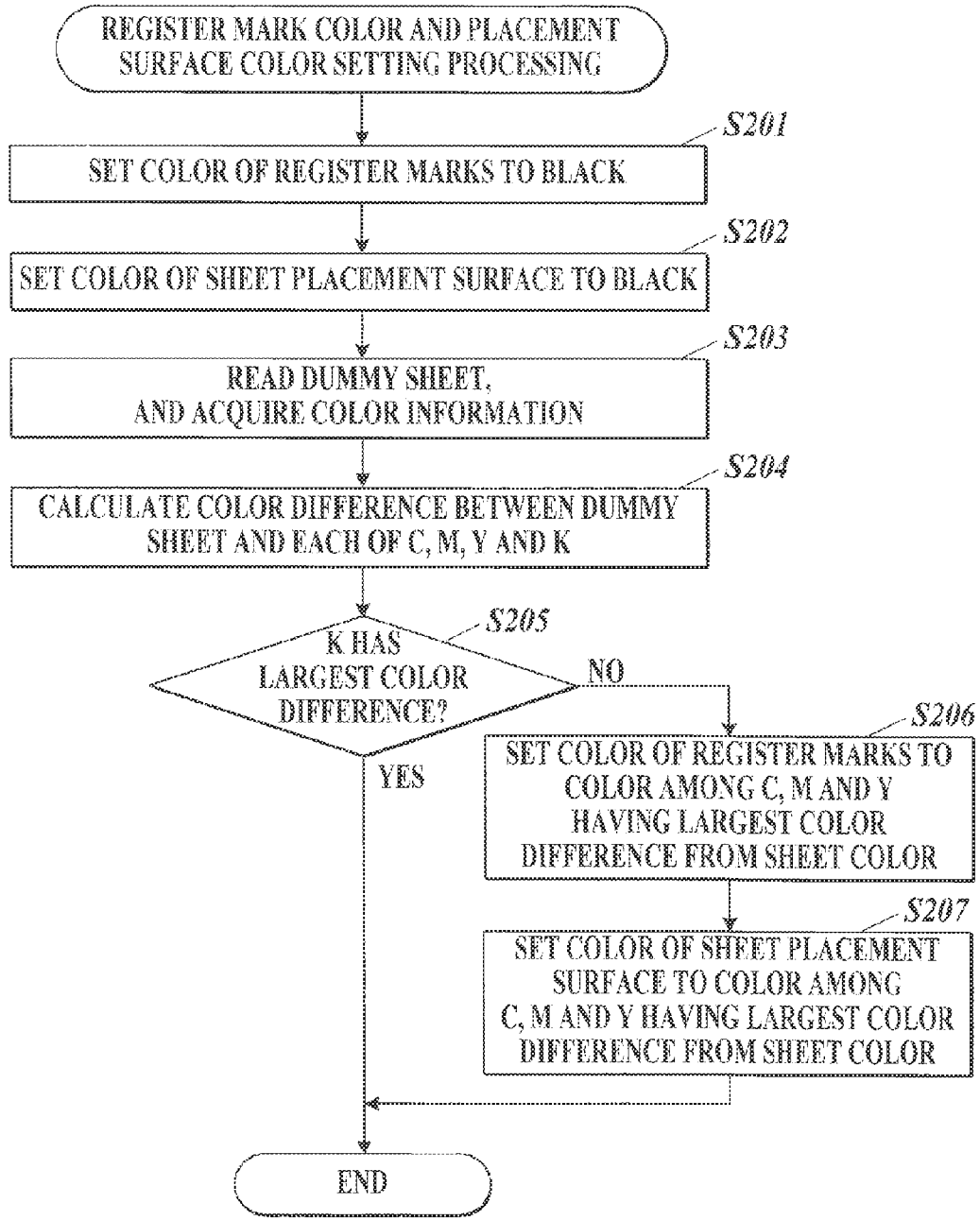
FIG. 6 is a flowchart showing a control procedure of register mark color and placement surface color setting processing.

FIG. 6 is a flowchart showing the control procedure of the register mark color and placement surface color setting processing.

When the register mark color and placement surface color setting processing is started, the control unit 40 sets the color of register mark M to black, stores the set value in the RAM 402 and outputs the set value to the control unit 30 of the image forming apparatus 3 (step S201).

Next, the control unit 40 sets the color of sheet placement surface 433 to black, stores the set value in the RAM 402 and outputs the set value to the control unit 30 of the image forming apparatus 3 (step S202).

The control units 30 and 40 control the reading unit 44 to read the dummy sheet, and acquire the color information indicating the color of dummy sheet (step S203). Specifically, the control unit 30 conveys the dummy sheet fed from the paper feeding apparatus 2 or the paper feeding tray 3a to the reading apparatus 4. Here, the dummy sheet has the same color as the color of sheet P on which an image is to be formed by the image forming system 1 after the position gap correction processing is finished. The control unit 40 conveys the dummy sheet conveyed to the reading apparatus 4 to the position of sheet placement unit 43, controls the reading unit 44 to read the dummy sheet which is placed on the sheet placement surface 433, and outputs imaging data. The control unit 40 acquires the color information indicating the color of dummy sheet from the imaging data, and stores the color information in the RAM 402. The color information is data including tone values of RGB color components, for example.

In step S203, the edges of dummy sheet need not be detected as long as the color information indicating the color of dummy sheet can be acquired. Thus, the dummy sheet may be placed on any sheet placement surface 433 in the sheet placement unit 43.

The control unit 40 calculates the color difference between the color of dummy sheet indicated by the acquired color information and each color of C, M, Y and K (step S204). Here, the control unit 40 converts the color of dummy sheet from RGB color system into L*a*b* color system, acquires the values of C, M, Y and K in the L*a*b* color system from the ROM 403, calculates the color difference in accordance with the above-mentioned algorithm and stores the result in the RAM 402.

The control unit 40 determines whether the color difference of dummy sheet from K is largest among the color differences of dummy sheet from the respective colors of C, M, Y and K (step S205). If it is determined that the color difference from K is the largest (step S205; YES), the control unit 40 ends the register mark color and placement surface color setting processing.

If it is determined that the color difference from a color other than K (that is, one of C, M and Y) is the largest (step S205; NO), the control unit 40 sets the color of register mark M to the color having the largest color difference from dummy sheet among C, M and Y, and outputs the set value to the control unit 30 of the image forming apparatus 3 (step S206).

The control unit 40 sets the color of sheet placement surface 433 to the color having the largest color difference from the dummy sheet among C, M and Y, and outputs the set value to the control unit 30 of the image forming apparatus 3 (step S207). That is, the control unit 40 sets the color of sheet placement surface 433 to be the same color as the color of register mark M which was set in step S206.

In steps S206 and S207, when the dummy sheet is black, for example, each color of register mark M and the sheet placement surface 433 is set to be Y (yellow).

When the processing of step S207 is finished, the control unit 40 ends the register mark color and placement surface color setting processing.

When the register mark color and placement surface color setting processing (step S101 in FIG. 5) is finished, the control unit 30 of the image forming apparatus 3 controls the image forming unit 38 to form the four register marks M in the color which was set in the register mark color and placement surface color setting processing on the surface of sheet P (step S102). Specifically, the control unit 30 conveys the sheet P from the paper feeding apparatus 2 or the paper feeding tray 3a to the image forming unit 38, the sheet P being a same sheet as the dummy sheet used in the register mark color and placement surface color setting processing. And the control unit 30 controls the image forming unit 38 to form the register marks M in the color indicated by the set value output from the control unit 40 in steps S201 or step S206 on the surface of sheet P. The control unit 30 conveys the sheet P on which the register marks M are formed to the reading apparatus 4.

The control unit 40 controls the reading unit 44 to read the register marks M on the surface of the sheet P conveyed to the reading apparatus 4, and calculates the distances between the sheet edges and the respective register marks M (step S103). Specifically, the control unit 40 rotates the main body 432 of the sheet placement unit 43 so that the sheet placement surface 433 faces the reading unit 44, the sheet placement surface having the color indicated by the set value which was output from the control unit 40 in step S202 or step S207 of register mark color and placement surface color setting processing. Subsequently, the control unit 40 conveys the sheet P conveyed to the reading apparatus 4 to the position of sheet placement unit 43, controls the reading unit 44 to read the sheet placement surface 433 and the sheet P which is placed on the sheet placement surface 433, and output the imaging data. The control unit 40 calculates the distances between the sheet edges and the respective four register marks M from the imaging data, stores the calculation result in the RAM 402, and outputs the result to the control unit 30 of the image forming apparatus 3.

The control unit 30 corrects the image forming position by the image forming unit 38 on the basis of the distance calculation result output from the control unit 40, and the image forming unit 38 forms the four register marks M on the back surface of the sheet P (step S104). Specifically, the control unit 30 corrects the image forming position by the image forming unit 38 so that the register marks M on the back surface are formed at the same positions as the positions of register marks M on the front surface by shifting the pixel positions of image data of an image to be formed on the sheet P (here, image data including register marks M on the back surface) on the basis of the above distance calculation result. The control unit 40 of the reading apparatus 4 reverses the front and back surfaces of the sheet P having the register marks M formed on the front surface by the reversing mechanism 451, and conveys the sheet P to the image forming apparatus 3. The control unit 30 of the image forming apparatus 3 forms the four register marks M on the back surface of the sheet P by the image forming unit 38 on the basis of the image data in which the pixel positions are shifted as described above. Here, the register marks M on the back surface are formed in the same color as the color of register marks M on the front surface. The control unit 30 conveys the sheet P having the register marks M formed thereon to the reading apparatus 4.

The method for correcting the image forming position by the image forming unit 38 is not limited to the above method. For example, the image forming position in the Y direction of FIG. 4 may be corrected by changing the timing of sending the sheet P to the image forming unit 38 by the resist rollers 391.

The control unit 40 controls the reading unit 44 to read the register marks M on the back surface of sheet P conveyed to the reading apparatus 4, and calculates the distances between the sheet edges and the respective register marks M similarly to step S103 (step S105). The control unit 40 calculates the distances between the sheet edges and the respective four register marks M on the back surface, and stores the result in the RAM 402.

The control unit 40 calculates the position gap amount of the image forming position between the front surface and the back surface (step S106). That is, the control unit 40 calculates, as the position gap amount, the difference between the distance from register mark M to sheet edge on the front surface of sheet P and the distance from register mark M to sheet edge on the back surface of sheet P. The control unit 40 stores the calculation result in the RAM 402.

The control unit 40 determines whether the calculated position gap amount is within a predetermined allowable range (step S107). For example, the control unit 40 determines that the position gap amount is within the allowable range if the position gap amount is equal to or less than 1 mm.

If it is not determined that the position gap amount is within the allowable range (step S107; NO), the control unit 40 outputs a predetermined control signal to the control unit 30, and the control unit 30 controls the display unit 33 to perform predetermined error display (step S108).

When the processing of step S108 is finished, the control unit 40 ends the position gap correction processing.

If it is determined that the position gap amount is within the allowable range (step S107; YES), the control unit 40 ends the position gap correction processing. In this case, the general image forming processing may be performed subsequently. In the general image forming processing, an image is formed on front and back surfaces of the sheet P having the same color as the color of dummy sheet in the setting according to the same image forming positions as the respective image forming positions when the register marks M for the front surface and the register marks M for the back surface were formed on the front and back surfaces of sheet P. The image is formed in the state in which the image forming position on the front surface and the image forming position on the back surface of sheet P match each other. In general image forming processing, the register marks M in the same color as the color of register marks M formed on the dummy sheet may be formed on the sheet P. By reading the register marks M with the reading apparatus 4 and correcting the image forming position by the image forming apparatus 3, the image forming position can be corrected during the execution of general image forming processing.

As described above, the image forming system 1 in the embodiment includes: an image forming apparatus 3 which forms a predetermined register mark M on the sheet P; a reading apparatus 4 which reads the register mark M formed on the sheet P; a control unit 30; and a control unit 40. The control unit 40 acquires color information indicating the color of sheet P (color information acquisition unit) and sets the color of register mark M, which is to be formed on the sheet P by the image forming apparatus 3, to be the color which can be distinguished by the reading apparatus 4 from the color indicated by the color information acquired by the control unit 40 (identification mark color setting unit). The control unit 30 controls the image forming apparatus 3 to form the register mark M in the color set by the control unit 40 on the sheet P (image forming control unit). As a result, the register mark M in the color distinguishable from the color of sheet P by the reading apparatus 4 is formed on the sheet P. Thus, regardless of the color of sheet P, the register mark M can be surely detected from the reading result by the reading apparatus 4, and the position of register mark M can be calculated accurately on the basis of the reading result. That is, the register mark M can be read appropriately regardless of the color of sheet P.

The image forming apparatus 3 forms an image on the sheet P by combining a plurality of color components, and the control unit 40 sets the color of register mark M to be the color having the largest color difference from the color indicated by the color information among the colors according to the plurality of color components (identification mark color setting unit). Thus, since the register mark M formed on the sheet P is in the color most distinguishable from the color of sheet P among the color components used for image formation in the image forming apparatus 3, the register mark M can be read more easily and accurately. The register mark M is formed only by the simple color toner by the monochromatic image forming unit corresponding to one of the color components of Y, M, C and K. This avoids the trouble of decrease in reading position accuracy of register mark M due to the position gap between the monochromatic images, the trouble being possibly generated in a case where the register mark M is formed of monochromatic images by a plurality of monochromatic image forming units, and thus the register mark M can be read more surely and accurately.

The reading apparatus 4 reads the color of sheet P, and the control unit 40 acquires the color information from the reading result of color of sheet P by the reading apparatus 4 (color information acquisition unit). Thus, the register marks M can be formed by setting the color of register marks M distinguishable from the color of sheet P by the reading apparatus 4 even when the color information indicating the sheet color of sheet P is not known.

The reading apparatus 4 reads the color of one sheet P among a plurality of sheets P in a same color, and the control unit 30 forms a register mark M on another sheet P among the plurality of sheets P with the image forming apparatus 3 (image forming control unit). Thus, by using one sheet of the plurality of sheets P as a dummy sheet and acquiring the color thereof, the register mark M for the other sheets P among the plurality of sheets P can be formed by setting the color of register mark M distinguishable from the color of sheet P by the reading apparatus 4.

The image forming system 1 in the embodiment includes a sheet placement unit 43 which has a plurality of sheet placement surfaces 433 that has respective colors among a plurality of predetermined colors. The control unit 40 sets the color of a sheet placement surface to be a color, from among the plurality of colors, which is distinguishable from the color indicated by the color information by the reading apparatus 4 (placement surface color setting unit), and places the sheet P on the sheet placement surface 433 in the set color (recording medium placement control unit). The reading apparatus 4 reads the edges of sheet P placed on the sheet placement surface 433. Thus, the sheet P is placed on the sheet placement surface 433 in the color distinguishable from the color of sheet P by the reading apparatus 4, and reading of sheet edges is performed. As a result, the edges of sheet P can be detected appropriately from the reading result of reading apparatus 4 regardless of the color of sheet P.

The image forming system 1 in the embodiment includes a sheet placement unit 43 having a plurality of sheet placement surfaces 433 which have respective colors among the colors according to the plurality of color components (Y, M, C and K). The control unit 40 sets the color of a sheet placement surface 433 to be the same color as the color of register mark M set by the control unit 40 as the identification mark color setting unit (placement surface color setting unit), and places the sheet P on the sheet placement surface 433 in the set color (recording medium placement control unit). The reading apparatus 4 reads the edges of sheet P placed on the sheet placement surface 433. Thus, by using the setting result of the color of register mark M without change, the color of sheet placement surface 433 can be set without performing the processing such as calculation of color difference again.

The reading apparatus 4 according to the embodiment is a reading apparatus which is connected to the image forming apparatus 3 that forms a predetermined register mark M on the sheet P, and the reading apparatus 4 includes a reading unit 44 which reads register mark M formed on the sheet P by the image forming apparatus 3 and a control unit 40. The control unit 40 acquires color information indicating the color of sheet P (color information acquisition unit), sets the color of register mark M to be formed on the sheet P by the image forming apparatus 3 to be a color distinguishable by the reading unit 44 from the color indicated by the color information acquired by the control unit 40 (identification mark color setting unit), and outputs the set value indicating the set color of register mark M to the image forming apparatus 3. As a result, the set value according to the color of register mark M distinguishable from the color of sheet P by the reading apparatus 4 can be output to the image forming apparatus 3. Thus, the register mark M, which is in the color according to the set value and formed on the sheet P by the image forming apparatus 3, can be read appropriately regardless of the color of sheet P.

Modification Example 1

Next, the modification example 1 of the embodiment will be described. The modification example 1 may be combined with other modification examples.

The modification example 1 is different from the embodiment in that the color of register mark M can be set to a color other than C, M, Y and K in the register mark color and placement surface color setting processing. Since the other respects are similar to those of the embodiment, the explanation thereof is omitted.

Figure 7:
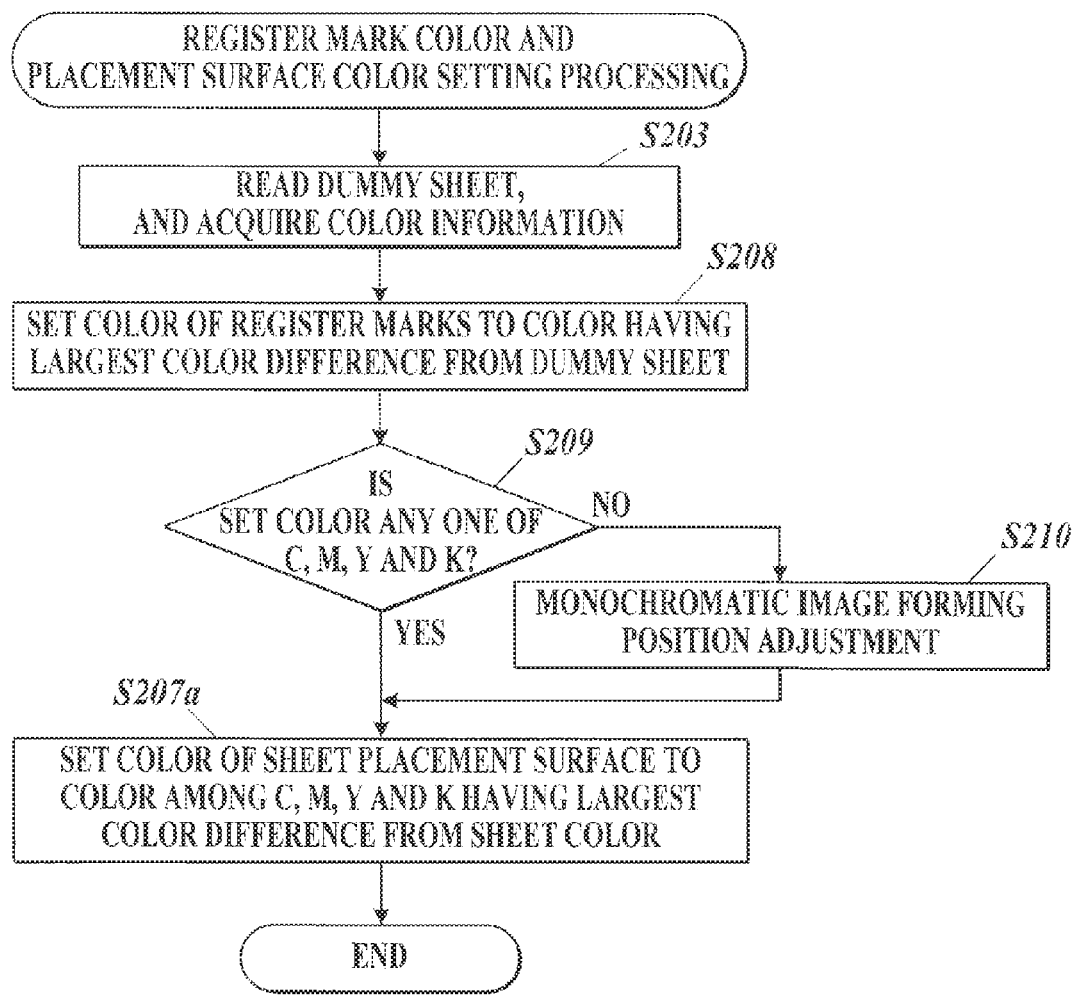
FIG. 7 is a flowchart showing a control procedure of register mark color and placement surface color setting processing according to a modification example 1.

FIG. 7 is a flowchart showing the control procedure of register mark color and placement surface color setting processing according to the modification example 1. The flowchart shown in FIG. 7 is obtained by deleting steps other than steps S203 and S207, adding steps S208 to S210 and changing the step S207 to step S207a in the flowchart shown in FIG. 6.

In the modification example 1, when the register mark color and placement surface color setting processing is started, the control unit 30 and 40 execute the processing of step S203. The processing of step S203 is similar to that of the embodiment.

The control unit 40 specifies the color having the largest color difference from the color of dummy sheet from among colors within a predetermined range, sets the color as the color of register mark M, and outputs the set value to the control unit 30 of the image forming apparatus 3 (step S208). In detail, within the color range capable of appearing on the sheet P in the image forming apparatus 3, the control unit 40 specifies the color having the color difference from the color of sheet P which is a predetermined value or more and having the largest color difference from the color of dummy sheet, and sets the specified color to be the color of register mark M. Specifically, in a range corresponding to the range of color which can be represented by the image forming apparatus 3 in the L*a*b* color system, the control unit 40 specifies the color indicated by the coordinate which is most apart from the coordinate showing the color of dummy sheet and sets the color to be the color of register mark M.

The control unit 40 determines whether or not the color of register mark M set in step S208 is any one of C, M, Y and K (that is, any one of the colors according to the color components used for image formation in the image forming apparatus 3) (step S209).

If it is determined that the set color of register mark M is not any one of C, M, Y and K, but is the color formed of color components of at least two colors among the C, M, Y and K (step S209; NO), the control unit 30 of the image forming apparatus 3 executes predetermined monochromatic image forming position adjustment processing (step S210). In the monochromatic image forming position adjustment processing, image data of each color of C, M, Y and K is corrected so that the positions of images formed on the sheet P by the respective monochromatic image forming units corresponding to C, M, Y and K of the image forming apparatus 3 match each other. The monochromatic image forming position adjustment processing, for example, includes processing of reading, with the reading apparatus 4, predetermined test patterns which were recorded on the sheet P with the respective monochromatic image forming units, acquiring image forming positions by the respective monochromatic image forming units from the imaging data and feeding back the positions to the control unit 30 of the image forming apparatus 3. By performing the monochromatic image forming position adjustment processing, images of a plurality of color components forming the register mark M are formed at the same position when the register mark M is formed on the sheet P in the position gap correction processing.

If it is determined that the set color of register mark M is any one of C, M, Y and K (step S209; YES), or when the processing of step S210 is finished, the control unit 40 sets the color of sheet placement surface 433 to be the color having the largest color difference from the color of dummy sheet among C, M, Y and K, and outputs the set value to the control unit 30 of the image forming apparatus 3 (step S207a).

When the processing of step S207a is finished, the control unit 40 ends the register mark color and placement surface color setting processing.

In the above example, the color of register mark M is set to be the color having the color difference from the color of sheet P which is a predetermined value or more and having the largest color difference from the color of dummy sheet within the range of colors which can appear on the sheet P in the image forming apparatus 3. However, instead of this, the color of register mark M may be set to be any one of the colors having the color difference from the color of sheet P which is predetermined value or more.

As described above, in the image forming system 1 of the modification example 1, the control unit 40 sets the color of register mark M to be the color having the color difference from the color indicated by the color information, the color difference being a predetermined value or more (identification mark color setting unit). Thus, the register mark M having the color difference distinguishable from the color of sheet P by the reading apparatus 4 is formed on the sheet P. Thus, the register mark M can be appropriately read regardless of the color of sheet P.

The image forming apparatus 3 has a plurality of monochromatic image forming units each of which forms a monochromatic image according to one of the plurality of color components, and forms an image on the sheet P by combining the monochromatic images of a plurality of color components. In a case where the color of register mark M, which was set by the control unit 40 as the identification mark color setting unit, includes two color components or more among the plurality of color components, the control unit 30 sets the forming positions of respective monochromatic images by the monochromatic image forming units so that the forming positions of register marks M match each other, the register marks being formed by respective monochromatic image forming units corresponding to the color components included in the color of register mark M (image forming position setting unit). Thus, in a case where the register mark M is formed of a plurality of monochromatic images by a plurality of monochromatic image forming units, the forming positions of a plurality of monochromatic images match each other, and thus, the position of register mark M can be calculated with high accuracy from the reading result of register mark M.

Modification Example 2

Next, the modification example 2 of the embodiment will be described. The modification example 2 maybe combined with other modification examples.

In the modification example 2, the configuration of reading apparatus 4 in the image forming system 1 according to the embodiment is included in the image forming apparatus 3. The modification example 2 is similar to the embodiment in the other respects.

Figure 8:
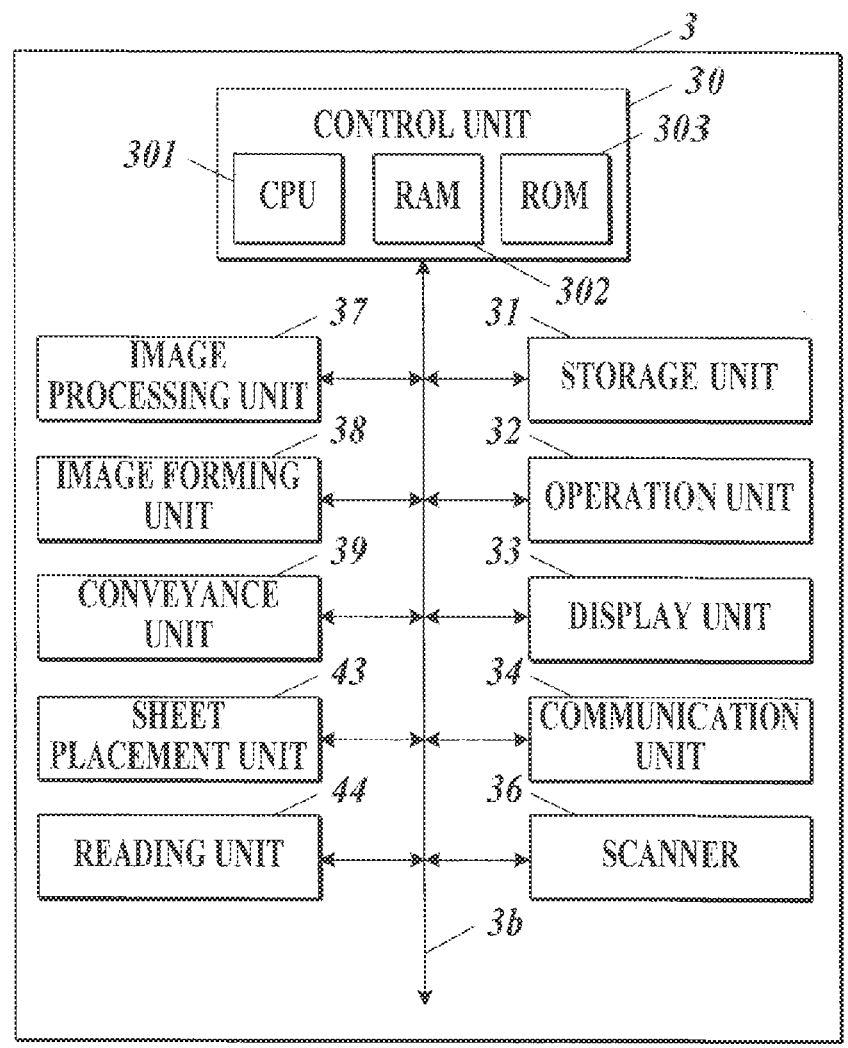
FIG. 8 is a block diagram showing a main functional configuration of an image forming apparatus according to a modification example 2.

FIG. 8 is a block diagram showing the main functional configuration of image forming apparatus 3 according to the modification example 2.

The image forming apparatus 3 in the modification example 2 includes a control unit 30 (color information acquisition unit, identification mark color setting unit, placement surface color setting unit, recording medium placement control unit, image forming control unit and image forming position setting unit) having a CPU 301, a RAM 302 and a ROM 303, a storage unit 31, an operation unit 32, a display unit 33, a communication unit 34, a scanner 36, an image processing unit 37, an image forming unit 38, a conveyance unit 39, a sheet placement unit 43 and a reading unit 44. The components have same configurations and functions as those of the components in the embodiment having the same reference numerals. Thus, detailed description thereof is omitted. In addition to the configurations and functions in the embodiment, the control unit 30, the storage unit 31 and the conveyance unit 39 respectively include the configurations and functions of control unit 40, storage unit 42 and conveyance unit 45 of the reading apparatus 4 in the embodiment.

In the modification example 2, the position gap correction processing shown in FIG. 5 and the register mark color and placement surface color setting processing shown in FIG. 6 are executed by the control unit 30 of the image forming apparatus 3. Since the sheet placement unit 43 and the reading unit 44 are also included in the image forming apparatus 3, reading operation of sheet P is performed in the image forming apparatus 3.

Only a part of the configurations in the reading apparatus 4 may be included in the image forming apparatus 3. For example, only the configuration and function of the control unit 40 in the reading apparatus 4 may be included in the control unit 30 of the image forming apparatus 3 so that the operations of the units in the reading apparatus 4 in the position gap correction processing and the register mark color and placement surface color setting processing may be executed under the control of control unit 30 of the image forming apparatus 3.

As described above, the image forming apparatus 3 in the modification example 2 includes an image forming unit 38 which forms a predetermined register mark M on the sheet P, a reading unit 44 which reads the register mark M formed on the sheet P by the image forming unit 38 and a control unit 30. The control unit 30 acquires color information indicating the color of sheet P (color information acquisition unit), sets the color of register mark M to be formed on the sheet P by the image forming unit 38 to be a color distinguishable by the reading unit 44 from the color indicated by the color information which was acquired by the control unit 30 (identification mark color setting unit), and forms the register mark M in the set color on the sheet P with the image forming unit 38 (image forming control unit). As a result, it is possible to form, on the sheet P, a register mark M in a color which can be distinguished from the color of sheet P by the reading unit 44 of the image forming apparatus 3, surely detect the register mark M from the reading result of the reading unit 44 regardless of the color of sheet P, and calculate the position of register mark M with high accuracy on the basis of the reading result. Therefore, in the image forming apparatus 3, the register mark M can be appropriately read regardless of the color of sheet P.

Modification Example 3

Next, the modification example 3 in the embodiment will be described. The modification example 3 may be combined with other modification examples.

In the modification example 3, in addition to or instead of the sheet placement surfaces 433 of C, M, Y and K in the sheet placement unit 43, a sheet placement surface 433 in a color other than C, M, Y and K is used. The modification example 3 is similar to the embodiment in other respects.

The sheet placement unit 43 in the modification example 3 includes a sheet placement surface 433 in a color other than the color components (C, M, Y and K) used in the image formation in the image forming apparatus 3. The colors of sheet placement surfaces 433 may be C, M, Y, K, W and WS as in the embodiment, or may include a color other than the above colors. The sheet placement unit 43 may not include the sheet placement surfaces 433 in C, M, Y and K.

In the modification example 3 having such configuration, in step S207 of register mark color and placement surface color setting processing shown in FIG. 6, the control unit 40 sets the color of sheet placement surface 433 to a color among the colors of respective sheet placement surfaces 433, the color being distinguishable from the color of sheet P in the reading result by the reading unit 44 and have a color difference of a predetermined value or more from the color of sheet P. The control unit 40 outputs the set value to the control unit 30 of the image forming apparatus 3. Here, similarly to the embodiment, the predetermined value of color difference can be the minimum value among specific values, each specific value satisfying the condition that the reading unit 44 can distinguish between arbitrary two colors having the color difference of the specific value.

The control unit 40 may set the color of sheet placement surface 433 to be a color among the colors of respective sheet placement surfaces 433, the color being distinguishable from the color of sheet P in the reading result by the reading unit 44 and has the largest color difference from the color of dummy sheet.

As described above, in the image forming system 1 according to the modification example 3, the control unit 40 sets the color of sheet placement surface 433 to be a color among the plurality of colors of sheet placement surfaces 433, the color having a color difference of a predetermined value or more from the color indicated by the color information (placement surface color setting unit). Thus, the color of sheet placement surface 433 can be set to be a color which can be distinguished from the color of sheet P by the reading apparatus 4, and the edges of sheet P on the sheet placement surface 433 can be read by the reading apparatus 4 regardless of the color of sheet P.

Modification Example 4

Next, the modification example 4 in the embodiment will be described. The modification example 4 may be combined with other modification examples.

The modification example 4 is regarding the register mark color and sheet placement surface color setting processing in a case where a single sheet P has a plurality of different color portions. The modification example 4 is similar to that of the embodiment in other respects.

Figure 9:
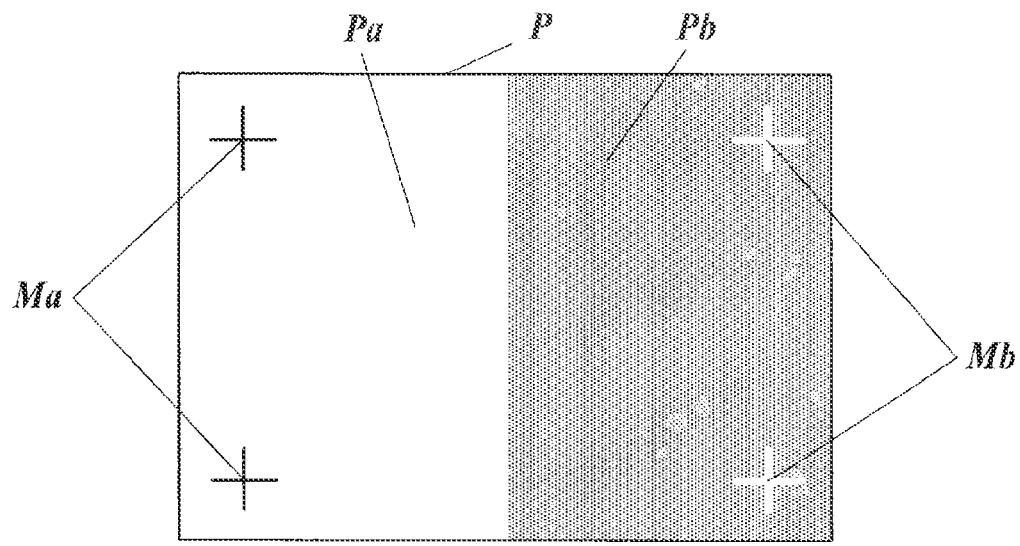
FIG. 9 is a view showing an example of register marks formed on a sheet in a modification example 4.

FIG. 9 is a view showing an example of register marks Ma and Mb formed on the sheet P in the modification example 4.

In the modification example 4, the sheet P has a first part Pa in white and a second part Pb in charcoal. Two register marks Ma in black (K) are formed in the first part Pa, and two register marks Mb in yellow (Y) are formed in the second part Pb.

In the modification example 4, in step S203 of register mark color and sheet placement surface color setting processing shown in FIG. 6, reading of dummy sheet and acquisition of color information are performed for each of the first part Pa and the second part Pb of the sheet P. In step S204, the color difference between the dummy sheet and each of the C, M, Y and K is calculated for each of the first part Pa and the second part Pb of the sheet P. The determination processing in step S205, the color setting processing of register park M in steps S206 and S207 and the setting processing of the color of sheet placement surface 433 are performed for each of the first part Pa and the second part Pb of the sheet P. In the example of sheet P shown in FIG. 9, the colors of register marks Ma and sheet placement surface 433 are set to be black (K) for the white first part Pa, and the colors of register marks Mb and sheet placement surface 433 are set to be yellow (Y) for the charcoal second part Pb.

In steps S102 and S104 of position gap correction processing shown in FIG. 5, the register marks Ma and Mb were formed on the first part Pa and the second part Pb of sheet P respectively in the respective colors which were set in step S206. In steps S103 and S105, when the first part Pa and the second part Pb of sheet P are read, reading by the reading unit 44 is performed in a state in which the sheet P is placed on the sheet placement surfaces 433 in the respective colors which were set in step S207. In the example of sheet P shown in FIG. 9, the sheet P is placed on the sheet placement surface 433K in black (K) to read the register marks Ma, and then the sheet P is placed on the sheet placement surface 433Y in yellow (Y) to read the register marks Mb.

The above description uses an example in which the sheet P has two different color parts. However, in a case where the sheet P has a three different color parts or more, the reading of color of sheet P, color setting of register marks M and sheet placement surface 433 and formation of register marks M in the set color may be performed for each of the different color parts of sheet P.

As described above, in the image forming system 1 of the modification example 4, the control unit 40 acquires a plurality of pieces of color information indicating the respective colors of a plurality of positions in one sheet P (color information acquisition unit), sets the colors of respective register marks M on the basis of the colors indicated by the acquired plurality of pieces of color information (identification mark color setting unit), and the control unit 30 controls the image forming apparatus 3 to form the register marks M at the positions respectively corresponding to a plurality of positions on the sheet P (image forming control unit), the register marks M having the respective colors which were set by the control unit 40 as the identification mark color setting unit. Thus, even in a case where the sheet P has a plurality of colors, the register marks M can be appropriately read regardless of the colors of sheet P.

The present invention is not limited to the above embodiment and modification examples, and various changes can be made.

For example, the embodiment and the modification examples have been described by using an example in which the color information indicating the color of sheet P is acquired from the reading result of dummy sheet by the reading unit 44; however, the present invention is not limited to this. For example, in addition to the reading unit 44, another reading unit may be provided upstream of the image forming unit 38 in the conveyance path of sheet P so that the color information is acquired from the reading result of sheet P by the reading unit. By this configuration, since image formation by the image forming unit 38 can be performed on the sheet P which was used for acquisition of color information, the consumption number of sheets P can be reduced.

The color information may be input from outside via the communication unit 34, or may be input by an input operation to the operation unit 32.

The embodiment and the modification examples have been described by illustrating an example in which the register marks M are formed on both of the front and back surfaces of sheet P; however, the present invention is not limited to this. For example, the present invention may be applied in a manner that the positions of register marks M formed on one surface of sheet P are calculated from reading result by the reading unit 44, the image forming position on front surface is corrected from the calculation result, an image is formed on the front surface of another sheet P.

The embodiment and modification examples have been described by using an example in which the colors of register mark M and sheet placement surface 433 are set on the basis of the color difference from the color of sheet P. However, the colors of register mark M and sheet placement surface 433 may be set on the basis of only the difference in brightness (corresponding to L* in the L*a*b* color system) from the sheet P.

The embodiment and the modification examples have been described by using an example in which the position gap correction processing is performed before the general image forming processing; however, the present invention is not limited to this. The above-mentioned position gap correction processing may be executed at a predetermined timing during execution of general image forming processing. Here, the predetermined timing may be a timing when an image is recorded on a predetermined number of sheets P in the general image forming processing, or may be a timing when the type of sheet P to be used are changed, for example.

The embodiment and the modification examples have been described by using an example in which the image forming position is corrected on the basis of the acquired positions of register marks M; however, the target to correct is not limited to the image forming position. For example, correction to enlarge or contract the image forming width in X direction and/or Y direction of the image formed on the sheet P may be performed on the basis of the acquired positions of register marks M.

Figure 10:
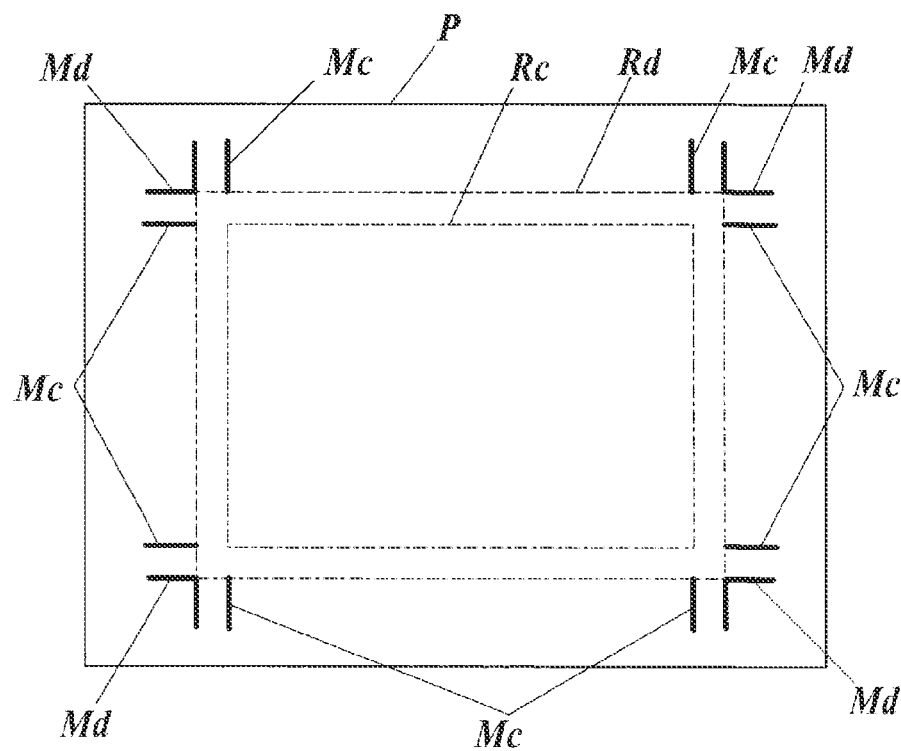
FIG. 10 is a view for explaining reference marks as identification marks.

The embodiment and the modification examples have been described by using register marks M as identification marks; however, the identification mark is not limited to this. The present invention can be applied to identification marks in various manners. For example, the identification mark may be reference marks Mc showing cutting position Rc of sheet P and reference marks Md showing cutting allowance position Rd of sheet P as shown in FIG. 10. The identification mark may be a predetermined reference mark showing a specific portion in the image formed on the sheet P. The identification mark may be a mark for inspecting the quality of image formed by the image forming apparatus 3.

The shape of identification mark is not limited to the cross shape as that of the register mark M, and may be an L shape such as a reference mark Md in FIG. 10 and a line segment such as a reference mark Mc as well as figures such as rectangle, polygon and circle, symbols and characters or combination thereof.

The embodiment and the modification examples have been described by using an example in which the color difference from the color of sheet P indicated by color information is calculated and the colors of register mark M and sheet placement surface 433 are set on the basis of the calculated value; however, the present invention is not limited to this. For example, a lookup table associating the chromaticity range of sheet P with the color of register mark M and/or sheet placement surface 433 may be stored in the ROM 403 and such like so that the color of register mark M and/or sheet placement surface 433 is set by referring to the lookup table on the basis of the color indicated by the acquired color information. In this case, since the color distinguishable from the color of sheet P by the reading unit 44 is directly specified in the lookup table in advance, when setting the colors of register mark M and sheet placement surface 433, it is possible to omit the processes such as determination of whether the color difference from sheet P is a predetermined value or more and comparison of color difference between a plurality of color candidates, and thus it is possible to reduce the load on the control unit 40.

The embodiment and the modification examples have been described by using an example in which the reading unit 44 includes the line sensor 441 for detecting, with imaging elements, the intensities of light that entered via a color filter transmitting light of R, G and B colors; however, the configuration of reading unit is not limited to this. For example, the reading unit may include a light source which emits light of R, G and B colors and imaging elements which respectively receive reflected light of R, G and B colors reflected at the sheet P and detect intensities.

The embodiment and the modification examples have been described by taking the electrophotographic image forming apparatus 3 as an example; however the type of image forming apparatus 3 is not limited to this. For example, the image forming apparatus may be ink jet type which ejects ink (color material) from a recording head to the recording medium conveyed by the conveyance device and forms an image by solidifying the ejected ink.

The embodiment and the modification examples have been described by taking the sheet P of flat paper which is cut by a predetermined length as a recording medium; however, continuous paper (roll paper) which is unwound from a roll may be used instead of the flat paper. As the recording medium, various media such as fabric or sheet-like resin in addition to paper can be used, the media enabling fixation of color material such as toners and ink to the surface.

The following features may be further included in the invention according to a reading apparatus which is connected to an image forming apparatus that forms a predetermined identification mark on a recording medium, the reading apparatus including: a reading unit which reads the identification mark that is formed on the recording medium by the image forming apparatus; a color information acquisition unit which acquires color information indicating a color of the recording medium; an identification mark color setting unit which sets a color of the identification mark to be formed on the recording medium by the image forming apparatus to a color distinguishable by the reading unit from the color indicated by the color information that is acquired by the color information acquisition unit; and an output unit which outputs, to the image forming apparatus, a set value indicating the color of the identification mark that is set by the identification mark color setting unit.

That is, preferably, in the reading apparatus, the identification mark color setting unit sets the color of the identification mark to a color among colors according to the plurality of color components used for image formation by the image forming apparatus, the color having a largest color difference from the color indicated by the color information.

Preferably, in the reading apparatus, the reading unit reads the color of the recording medium, and the color information acquisition unit acquires the color information from a reading result of the color of the recording medium by the reading apparatus.

Preferably, the reading apparatus includes: a recording medium placement unit which has a plurality of recording medium placement surfaces in respective colors among a plurality of predetermined colors; a placement surface color setting unit which sets a color of a recording medium placement surface to a color distinguishable by the reading unit from the color indicated by the color information among the plurality of colors; and a recording medium placement control unit which places the recording medium on the recording medium placement surface in the color set by the placement surface color setting unit, and the reading unit reads an edge of the recording medium placed on the recording medium placement surface.

Preferably, the reading apparatus includes: a recording medium placement unit which has a plurality of recording medium placement surfaces in respective colors among colors according to a plurality of color components; a placement surface color setting unit which sets a color of a recording medium placement surface to a same color as the color of the identification mark set by the identification mark color setting unit; and a recording medium placement control unit which places the recording medium on the recording medium placement surface in the color set by the placement surface color setting unit, and the reading unit reads an edge of the recording medium placed on the recording medium placement surface.

Preferably, in the reading apparatus, the color information acquisition unit acquires a plurality of pieces of color information indicating respective colors at a plurality of positions in one recording medium, and the identification mark color setting unit sets colors of the identification mark on the basis of the colors indicated by the plurality of pieces of the color information acquired by the color information acquisition unit.

The following features may be further included in the invention according to an image forming apparatus, including: an image forming unit which forms a predetermined identification mark on a recording medium; a reading unit which reads the identification mark that is formed on the recording medium by the image forming unit; a color information acquisition unit which acquires color information indicating a color of the recording medium; an identification mark color setting unit which sets a color of the identification mark to be formed on the recording medium by the image forming unit to a color distinguishable by the reading unit from the color indicated by the color information that is acquired by the color information acquisition unit; and an image forming control unit which controls the image forming unit to form the identification mark in the color set by the identification mark color setting unit on the recording medium.

That is, preferably, in the image forming apparatus, the image forming unit forms an image on the recording medium by combining a plurality of color components, and the identification mark color setting unit sets the color of the identification mark to a color among colors according to the plurality of color components, the color having a largest color difference from the color indicated by the color information.

Preferably, in the image forming apparatus, the image forming unit includes a plurality of monochromatic image forming units which respectively forms monochromatic images according to respective colors of a plurality of color components, and the image forming unit forms an image on the recording medium by combining the monochromatic images of the plurality of color components; and the image forming unit includes an image forming position setting unit which, in a case where the color of the identification mark set by the identification mark color setting unit includes two color components or more among the plurality of color components, sets forming positions of the monochromatic images by the monochromatic image forming units so that forming positions of the identification mark by the respective monochromatic image forming units match each other, the monochromatic image forming units corresponding to the respective color components included in the color of the identification mark.

Preferably, in the image forming apparatus, the reading unit reads the color of the recording medium, and the color information acquisition unit acquires the color information from a reading result of the color of the recording medium by the reading unit.

Preferably, in the image forming apparatus, the reading unit reads a color of one recording medium among a plurality of recording media in a same color, and the image forming control unit controls the image forming unit to form the identification mark on another recording medium among the plurality of recording media.

Preferably, the image forming apparatus further includes a recording medium placement unit which has a plurality of recording medium placement surfaces in respective colors among a plurality of predetermined colors; a placement surface color setting unit which sets a color of a recording medium placement surface to a color distinguishable by the reading unit from the color indicated by the color information among the plurality of colors; and a recording medium placement control unit which places the recording medium on the recording medium placement surface in the color set by the placement surface color setting unit, the reading unit reads an edge of the recording medium placed on the recording medium placement surface.

Preferably, the image forming apparatus further includes a recording medium placement unit which has a plurality of recording medium placement surfaces in respective colors among colors according to a plurality of color components; a placement surface color setting unit which sets a color of a recording medium placement surface to a color in a same color as the color of the identification mark set by the identification mark color setting unit; and a recording medium placement control unit which places the recording medium on the recording medium placement surface in the color set by the placement surface color setting unit, and the reading unit reads an edge of the recording medium placed on the recording medium placement surface.

Preferably, in the image forming apparatus, the color information acquisition unit acquires a plurality of pieces of color information indicating respective colors at a plurality of positions in one recording medium, the identification mark color setting unit sets colors of identification marks on the basis of the colors indicated by the plurality of pieces of the color information acquired by the color information acquisition unit, and the image forming control unit controls the image forming unit to form the identification marks in the colors set by the identification mark color setting unit at respective positions corresponding to the plurality of positions in the recording medium.

Though several embodiments of the present invention have been described above, the scope of the present invention is not limited to the above embodiments, and includes the scope of inventions, which is described in the scope of claims, and the scope equivalent thereof.

The entire disclosure of Japanese Patent Application No. 2015-036061 filed on Feb. 26, 2015 including description, claims, drawings, and abstract are incorporated herein by reference in its entirety.

What is claimed is:

1. An image forming system that includes an image forming apparatus which forms a predetermined identification mark on a recording medium and a reading apparatus which reads the identification mark formed on the recording medium, the image forming system comprising:

a color information acquisition sensor which acquires color information indicating a color of the recording medium;

an identification mark color setting unit which sets a color of the identification mark to be formed on the recording medium by the image forming apparatus to a color distinguishable by the reading apparatus from the color indicated by the color information that is acquired by the color information acquisition unit;

an image forming control unit which controls the image forming apparatus to form the identification mark in the color set by the identification mark color setting unit on the recording medium;

a recording medium placement unit having a body with a plurality of recording medium placement surfaces in respective colors among a plurality of predetermined colors, the body being rotatable about a rotational axis; and a placement surface color setting unit which controls the recording medium placement unit so that one of the recording medium placement surfaces, with a color distinguishable by the reading apparatus from the color indicated by the color information among the plurality of colors, faces the recording medium.

2. The image forming system of claim 1, wherein the identification mark color setting unit sets the color of the identification mark to a color having a color difference of a predetermined value or more from the color indicated by the color information.

3. An image forming system that includes an image forming apparatus which forms a predetermined identification mark on a recording medium and a reading apparatus which reads the identification mark formed on the recording medium, the image forming system comprising:

a color information acquisition sensor which acquires color information indicating a color of the recording medium;

an identification mark color setting unit which sets a color of the identification mark to be formed on the recording medium by the image forming apparatus to a color distinguishable by the reading apparatus from the color indicated by the color information that is acquired by the color information acquisition unit, wherein the image forming apparatus forms an image on the recording medium by combining a plurality of color components, and the identification mark color setting unit sets the color of the identification mark to a color among colors according to the plurality of color components, the color having a largest color difference from the color indicated by the color information;

an image forming control unit which controls the image forming apparatus to form the identification mark in the color set by the identification mark color setting unit on the recording medium;

a recording medium placement unit having a body with a plurality of recording medium placement surfaces in respective colors among a plurality of predetermined colors, the body being rotatable about a rotational axis; and a placement surface color setting unit which controls the recording medium placement unit so that one of the recording medium placement surfaces, with a color distinguishable by the reading apparatus from the color indicated by the color information among the plurality of colors, faces the recording medium.

4. The image forming system of claim 1, wherein the image forming apparatus includes a plurality of monochromatic image formers which respectively forms monochromatic images according to respective colors of a plurality of color components, and the image forming apparatus forms an image on the recording medium by combining the monochromatic images of the plurality of color components; and the image forming apparatus includes an image forming position setting unit which, in a case where the color of the identification mark set by the identification mark color setting unit includes two color components or more among the plurality of color components, sets forming positions of the monochromatic images by the monochromatic image forming units so that forming positions of the identification mark by the respective monochromatic image forming units match each other, the monochromatic image forming units corresponding to the respective color components included in the color of the identification mark.

5. The image forming system of claim 1, wherein the reading apparatus reads the color of the recording medium, and the color information acquisition unit acquires the color information from a reading result of the color of the recording medium by the reading apparatus.

6. The image forming system of claim 5, wherein the reading apparatus reads a color of one recording medium among a plurality of recording media in a same color, and the image forming control unit controls the image forming apparatus to form the identification mark on another recording medium among the plurality of recording media.

7. The image forming system of claim 1, further comprising:

a recording medium placement control unit which places the recording medium on the recording medium placement surface in the color set by the placement surface color setting unit, wherein the reading apparatus reads an edge of the recording medium placed on the recording medium placement surface.

8. The image forming system of claim 1, wherein the placement surface color setting unit sets the color of the recording medium placement surface to a color among the plurality of colors, the color having a color difference of a predetermined value or more from the color indicated by the color information.

9. The image forming system of claim 3, further comprising:

a recording medium placement control unit which places the recording medium on the recording medium placement surface in the color set by the placement surface color setting unit, wherein the reading apparatus reads an edge of the recording medium placed on the recording medium placement surface.

10. The image forming system of claim 1, wherein the color information acquisition unit acquires a plurality of pieces of color information indicating respective colors at a plurality of positions in one recording medium, the identification mark color setting unit sets colors of identification marks on the basis of the colors indicated by the plurality of pieces of the color information acquired by the color information acquisition unit, and the image forming control unit controls the image forming apparatus to form the identification marks in the respective colors set by the identification mark color setting unit at respective positions corresponding to the plurality of positions in the recording medium.

11. A reading apparatus which is connected to an image forming apparatus that forms a predetermined identification mark on a recording medium, the reading apparatus comprising:
- a reading unit which reads the identification mark that is formed on the recording medium by the image forming apparatus;
- a color information acquisition unit which acquires color information indicating a color of the recording medium;
- an identification mark color setting unit which sets a color of the identification mark to be formed on the recording medium by the image forming apparatus to a color distinguishable by the reading unit from the color indicated by the color information that is acquired by the color information acquisition unit; and
- an output unit which outputs, to the image forming apparatus, a set value indicating the color of the identification mark that is set by the identification mark color setting unit;
- a recording medium placement unit having a body with a plurality of recording medium placement surfaces in respective colors among a plurality of predetermined colors, the body being rotatable about a rotational axis; and
- a placement surface color setting unit which controls the recording medium placement unit so that one of the recording medium placement surfaces, with a color distinguishable by the reading apparatus from the color indicated by the color information among the plurality of colors, faces the recording medium.

12. An image forming apparatus, comprising:
- an image forming unit which forms a predetermined identification mark on a recording medium;
- a reading unit which reads the identification mark that is formed on the recording medium by the image forming unit;
- a color information acquisition unit which acquires color information indicating a color of the recording medium;
- an identification mark color setting unit which sets a color of the identification mark to be formed on the recording medium by the image forming unit to a color distinguishable by the reading unit from the color indicated by the color information that is acquired by the color information acquisition unit;
- an image forming control unit which controls the image forming unit to form the identification mark in the color set by the identification mark color setting unit on the recording medium;
- a recording medium placement unit having a body with a plurality of recording medium placement surfaces in respective colors among a plurality of predetermined colors, the body being rotatable about a rotational axis; and
- a placement surface color setting unit which controls the recording medium placement unit so that one of the recording medium placement surfaces, with a color distinguishable by the reading apparatus from the color indicated by the color information among the plurality of colors, faces the recording medium.

* * * * *